Dec. 9, 1952

R. A. B. HEAP 2,620,891

TELEPHONE RECEIVING DEVICE FOR TWO LISTENERS

Filed Feb. 12, 1951

INVENTOR.

Roger A. B. Heap.

BY

Kenway, Jenney, Witter & Hildreth.

ATTORNEYS

Patented Dec. 9, 1952

2,620,891

UNITED STATES PATENT OFFICE 2,620,891

TELEPHONE RECEIVING DEVICE FOR TWO LISTENERS

Roger A. B. Heap, Lyme, Conn.

Application February 12, 1951, Serial No. 210,601

3 Claims. (Cl. 181—27)

This invention relates to telephone apparatus and in particular to a device adapted to be fitted to a telephone receiver to enable two persons to listen simultaneously to an incoming message with convenience and facility.

It often happens in business and in military operations that a message transmitted by telephone is of such a nature as to demand multiple action with minimum loss of time. For example, orders transmitted from a command post should be recorded by a clerk for future reference and also should be acted on at once by the officer receiving them. Business information received by telephone often needs to be written down; at the same time the executive receiving the message may well have to prepare an immediate reply while he is still listening to the message.

While one solution of the problem is to employ a plurality of telephones, the expense is relatively large, and there is the further drawback that when more than one receiver is connected in the circuit the voltage drops, reducing the signal level and rendering reception difficult and uncertain. Moreover in military operations the transport of equipment must of necessity be minimized.

The principal object of my invention is to make it possible for two persons to receive messages simultaneously from a single telephone receiver.

Another object of the invention is to reduce the number of telephone receivers required for efficient operations of military or business character.

An important feature of the invention resides in a hollow casing adapted to fit over the end of a telephone receiver and provided with opposed elongated sound chambers each having a listening orifice at its outer end.

Figure 1:
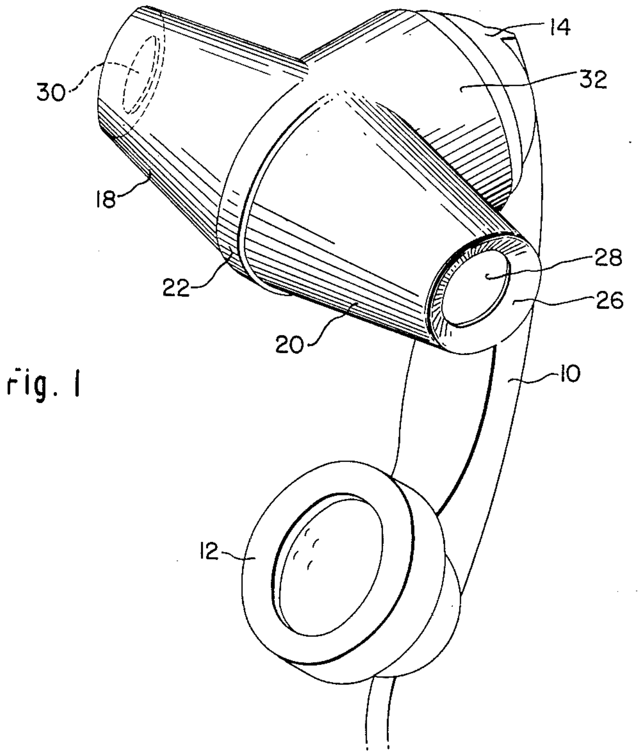
Figure 2:
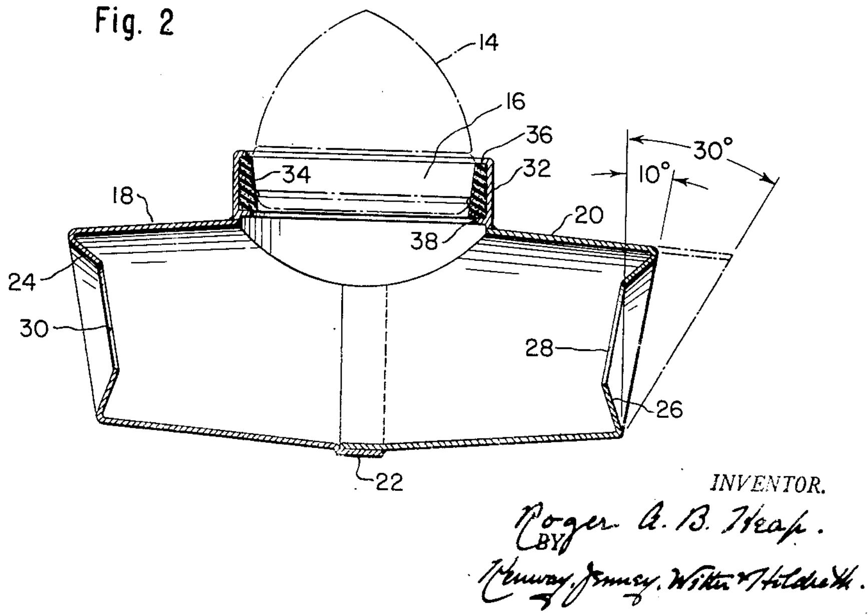

These and other objects and features of the invention will be more readily understood and appreciated from the following detailed description of a preferred embodiment selected for purposes of illustration and shown in the accompanying drawing, in which:

Fig. 1 is a view in perspective of a device constructed in accordance with the invention and applied to a conventional telephone receiver, and Fig. 2 is a view in cross section through the device shown in Fig. 1.

Although the appliance of my invention may easily be adapted for use in connection with any form of telephone or radio receiver, I have shown in the drawing a conventional telephone hand set or "French phone," including an elongated handle 10 carrying a transmitter housing 12 at its lower end and a receiver housing 14 at its upper end. The receiver end of the hand set terminates in a threaded cap 16 which covers the conventional diaphragm (not shown) vibrated in response to electro-magnetic pulses transmitted thereto.

The device of my invention includes an elongated rigid casing formed of thin plastic material, metal, or the like and composed essentially of two hollow frusto-conical shells 18 and 20 disposed in coaxial opposed relation and interfitting at their larger ends as shown at 22; where the shells are fused or cemented together to form a unitary hollow casing.

The smaller ends of the half shells 18 and 20 are partially closed by re-entrant annular walls 24 and 26 provided with centrally located sound-emitting apertures 28 and 30. The planes of the extremities of the outer ends of the shells 18 and 20 are preferably inclined with respect to the long axis of the casing by an angle of 10° to 30° from front to rear, thus orienting the heads of both listeners toward the mouthpiece or transmitter housing 12. In other words, the terminal planes converge forwardly in the device.

At the center of the bipartite casing and at the rear thereof the casing is apertured and provided with an outwardly extending annulus 32, surrounding the central aperture. Disposed within the annulus is a cylindrical gasket or sleeve 34 of sponge rubber or similar material having an inwardly tapering wall and held in place between an inwardly directed circumferential lip 36 formed in the outer margin of the annulus 32 and an internal shoulder 38.

When it is desired to employ the device of this invention, the annulus is fitted over the cap 16 on the end of the receiver, the two being forced together until the cap is gripped firmly by the rubber gasket. In addition to holding the device upon the receiver, the annulus and gasket seal the receiver to the casing, and sound entering the unobstructed-sound chamber provided by the casing escapes exclusively through the end apertures 28 and 30. Each listener places an ear to one of these sound-emitting apertures and is thereby enabled to hear mesages emanating from the telephone receiver.

The length of the half shells 18 and 20 is not critical but may be determined by such matters as the weight of the device and the most convenient distance to be maintained between the heads of the listeners. The materials and shapes are relatively unimportant provided there is achieved a double-ended sound chamber effectively coupled to the receiver.

Having now disclosed and illustrated the preferred embodiment of my invention, what I claim as new and desire to secure by Letters Patent of the United States is:

1. A telephone receiving appliance for two listeners, comprising a pair of hollow frusto-conical rigid shells united at their larger ends in concentric relation and together providing an unobstructed sound chamber, the outer smaller ends of the shells terminating in open sound-emitting apertures spaced apart by the length of the united shells, the inner portions of the said shells being provided with a central opening in the rear side of the appliance, and an annular gasket in said aperture for engaging the receiver of a telephone set.

2. A telephone receiving appliance of the character described in claim 1 further characterized by re-entrant annular walls in the outer ends of the shells which define the sound-emitting apertures.

3. A telephone receiving appliance of the character described in claim 1 further characterized by frusto-conical shells that terminate at their outer ends in planes forwardly convering at an angle of 10° to 30°, thus orienting the heads of both listeners toward the transmitter of a hand set when the appliance is used in connection therewith.

ROGER A. B. HEAP.

REFERENCES CITED

The following references are of record in the file of this patent:

UNITED STATES PATENTS

| Number | Name | Date |
|---|---|---|
| 961,157 | Perry | June 14, 1910 |
| 1,399,083 | Scher | Dec. 6, 1921 |
| 1,492,296 | Hipwell et al. | Apr. 29, 1924 |
| 2,058,132 | Cirelli | Oct. 20, 1936 |

FOREIGN PATENTS

| Number | Country | Date |
|---|---|---|
| 174,474 | Switzerland | Jan. 15, 1935 |